US006859422B2

(12) United States Patent
Sheu et al.

(10) Patent No.: US 6,859,422 B2
(45) Date of Patent: Feb. 22, 2005

(54) TRACKING ACCESS CONTROL METHOD AND DEVICE FOR OPTICAL STORAGE MEDIUM DRIVE

(75) Inventors: Jia-Shing Sheu, Taipei Hsien (TW); Chih-Kang Hsu, Taipei (TW)

(73) Assignee: VIA Technologies Inc., Hsin-Tien (TW)

( * ) Notice: Subject to any disclaimer, the term of this patent is extended or adjusted under 35 U.S.C. 154(b) by 166 days.

(21) Appl. No.: 10/063,439

(22) Filed: Apr. 24, 2002

(65) Prior Publication Data

US 2002/0172105 A1 Nov. 21, 2002

(30) Foreign Application Priority Data

May 18, 2001 (TW) ........................................ 90112005 A

(51) Int. Cl.$^7$ ............................................. G11B 21/08
(52) U.S. Cl. ................................................... 369/30.17
(58) Field of Search ............................ 369/215, 30.16, 369/30.17, 30.1, 30.11, 30.12, 30.13, 30.14, 44.28, 44.27, 44.29

(56) References Cited

U.S. PATENT DOCUMENTS

| 4,926,405 A | * | 5/1990 | Hangai et al. ............ 369/30.16 |
| 5,050,146 A | * | 9/1991 | Richgels et al. .......... 369/30.17 |
| 5,598,384 A | * | 1/1997 | Aoshima et al. .......... 369/30.17 |
| 5,623,460 A | * | 4/1997 | Nagasawa et al. ......... 369/30.1 |
| 5,623,464 A | * | 4/1997 | Tani ......................... 369/30.17 |
| 5,699,332 A | * | 12/1997 | Nakano .................... 369/30.16 |
| 5,905,701 A | * | 5/1999 | Lee et al. ................. 369/44.28 |
| 6,606,283 B2 | * | 8/2003 | Chan ........................ 369/30.17 |

* cited by examiner

Primary Examiner—Tan Dinh
(74) Attorney, Agent, or Firm—Winston Hsu

(57) ABSTRACT

A tracking access control method for an optical storage medium drive is used for reading data stored in an optical storage medium. The optical storage medium drive has a sled capable of sliding in a radial direction of the optical storage medium. The method is capable of exerting a brake force on the sled according to a sliding speed of the sled relative to the optical storage medium when the sled is located at an intermediate position in a sliding course from an initial position to a target position on the optical storage medium.

10 Claims, 2 Drawing Sheets

TRACKING ACCESS CONTROL METHOD AND DEVICE FOR OPTICAL STORAGE MEDIUM DRIVE

BACKGROUND OF INVENTION

1. Field of the Invention

The invention relates to a tracking access control method and device for an optical storage medium drive, and more particularly, to a tracking access control method and device for exerting a brake force on a sled according to a sliding speed of the sled relative to an optical storage medium.

2. Description of the Prior Art

In modern society, there has been an increase in the use of optical storage medium, such as compact discs, for recording a huge amount of high-density digital information. The optical storage medium has advantages of lightweight, small size, and large capacity for storing data. Meanwhile, a reproducing apparatus, referred to as an optical storage medium drive, is indispensable for reading out information on optical storage medium. With the demand of high access speed for the optical storage medium, the rotation rate of the optical storage medium drive gradually increased. Furthermore, in order to read high-density data rapidly, to precisely read information from the optical storage medium is necessary. Therefore, developing a precise control system for the optical storage medium drive has become an important topic.

Please refer to FIG. 1. FIG. 1 is a schematic diagram illustrating the inner construction of an optical storage medium drive 10. For clarity of illustration, unrelated parts of the optical storage medium drive 10 are omitted. The optical storage medium drive 10 is used to read data stored in an optical storage medium 12. Also, only a portion of the optical storage medium 12 is shown in FIG. 1 for clarity. Data is stored in tracks of the optical storage medium 12. Three tracks 30A, 30B, 30C are shown in FIG. 1. Additionally, tracks, with data stored thereon, can be divided a radial direction of the optical storage medium 12 into a plurality of sectors on the tracks.

The optical storage medium drive 10 comprises a motor 14 for rotating a rotatable base 16 and further driving the optical storage medium 12 disposed on the rotatable base 16. The optical storage medium drive 10, used for accessing data on the optical storage medium 12, has a sled 20 capable of sliding left and right along a slide 18, i.e., along direction 22. A control circuit 29 controls the sliding movement of the sled 20. An actuator 24 is installed on the sled 20 to slide left and right along direction 26 within a small range on the sled 20. An optical pickup head 28 is fixed on the actuator 24 and can direct light beam, such as laser beam, to shine onto bottom surface of the optical storage medium 12. After the incident light beam is modulated by tracks of the optical storage medium 12 and reflected back to the optical pickup head 28, the optical storage medium drive 10 can thus read data stored on the optical storage medium 12.

When the optical storage medium drive 10 reads data stored in different tracks of the optical storage medium 12, a track crossing operation is carried out. For example, when the optical storage medium drive 10 desires to read data in the track 30C after data stored in the track 30A is read, the optical pickup head 28 is moved at high speed by the sled 20 and stopped in the vicinity of the track 30C. Then, the optical pickup head 28 is finely moved by the actuator 24 to the desired track 30C so as to accurately read data in the track 30C.

In the prior method for controlling the sled 20, when the sled 20 is moved from initial position to a target position, an accelerated force is exerted on the sled 20 so as to accelerate the sled 20 to move toward the target position. Meanwhile, a tracking access process is performed during the movement so as to identify the current position of the sled 20. When the sled 20 approaches the target position, a brake force in the opposite direction of the accelerated force is exerted on the sled 20 so as to decelerate the sled 20. Meanwhile, the tracking access process is also performed to lock the sled 20 at the target position.

In the prior control method, the magnitude and the duration of the brake force exerted on the sled 20 are preset at fixed values. Under this situation, when the speed of the sled 20 sliding from the initial position to the target position is too high, the brake force cannot decelerate the sled 20 to an appropriate speed within a finite period. Finally, the sled 20 has possibility of passing the target position due to the high speed that cannot be decelerated in time. When the target position is missed, the sled 20 has to take time in the subsequent calibration process to reach the target position. On the other hand, when the speed of the sled 20 in sliding is too slow, the brake force decelerates the sled 20 and causes the sled 20 to be stopped too early. Then, the sled 20 also needs to take time to reach the target position by the fine movement of the actuator 24. Therefore, whenever the sled 20 is moved too quickly or slowly, the prior control method is required to take time to lock the sled 20 to the target position. This cannot meet the high-speed demand of the optical storage medium drive 10 for accessing information in the optical storage medium 12.

Furthermore, since the accelerated force exerted by an exerting mechanism, e.g., a servo device, of each of the optical storage medium drives 10 may be either large or small, depending on the differences in the hardware fabrication, the prior control method that provides fixed brake force cannot be performed well in optical storage medium drives 10 with the different accelerated forces. These differences also cause the prior optical storage medium drives 10 to take time for locking the sleds 20 to the target positions. Thus, the read efficiency of the optical storage medium drive 10 is substantially decreased.

SUMMARY OF INVENTION

It is therefore a primary objective of the claimed invention to provide a tracking access control method and device for an optical storage medium drive to solve the above-mentioned problem.

According to the claimed invention, a tracking access control method for an optical storage medium drive is used for reading data stored in an optical storage medium. The optical storage medium drive has a sled capable of sliding in a radial direction of the optical storage medium. The method comprises exerting a brake force on the sled according to a sliding speed of the sled relative to the optical storage medium when the sled is located at an intermediate position in sliding from an initial position to a target position on the optical storage medium.

It is an advantage of the claimed invention that the tracking access control method for the optical storage medium drive is capable of exerting the brake force on the sled according to the sliding speed of the sled relative to the optical storage medium to overcome shortcomings in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
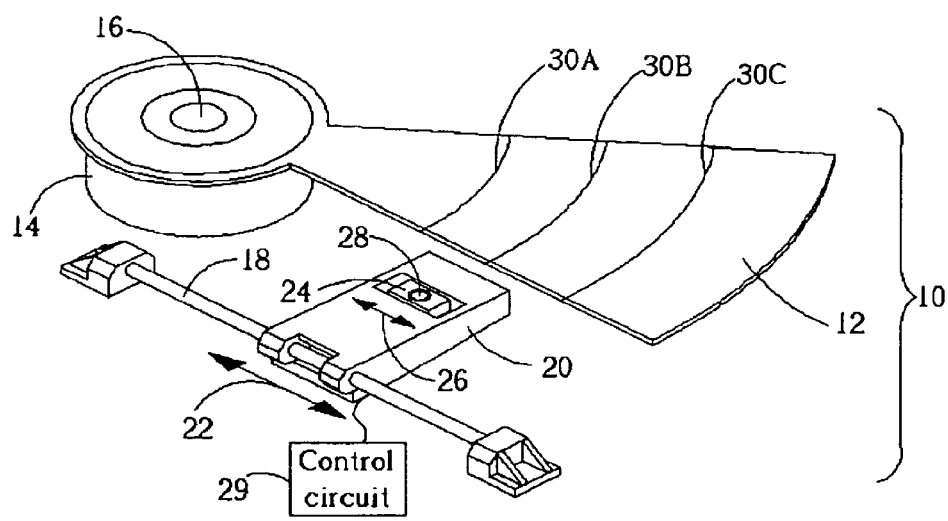
FIG. 1 is a schematic diagram illustrating an inner construction of an optical storage medium drive.
Figure 2:
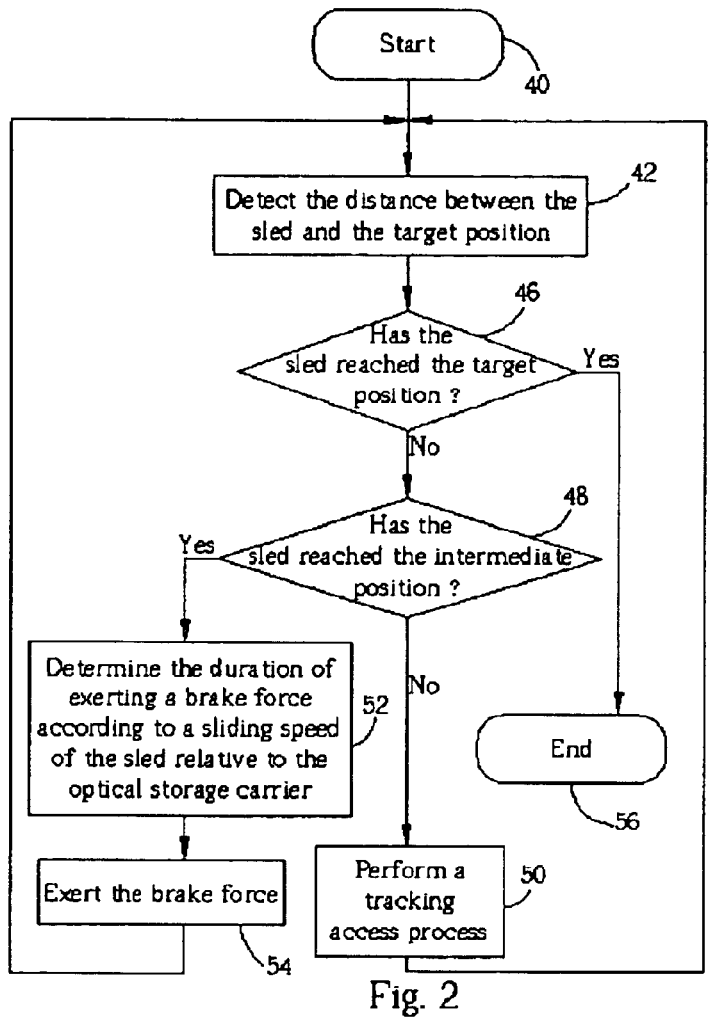
FIG. 2 is a flow chart of a tracking access control method of the optical storage medium drive according to the present invention.

Please refer to FIG. 2. FIG. 2 is a flow chart of a tracking access control method of an optical storage medium drive according to the present invention. The flow chart illustrates a procedure for controlling a sled to move from an initial position (an initial track) on an optical storage medium to a target position (a target track) on the optical storage medium. One feature of the present invention is that, a brake force is dynamically determined according to a sliding speed of the sled when the sled passes through an intermediate position in sliding. The procedure comprises the following steps:

Step 40:

The method is started. The sled is started to slide from the initial position by an accelerated force.

Step 42:

The distance between the sled and the target position is detected. The detection is completed by analyzing a received reflected light beam from an optical pickup head so as to realize which tracks of the optical storage medium correspond to the current position of the sled.

Step 46:

If the sled reaches the target position of the optical storage medium, go to step 56. If not, go to step 48.

Step 48:

It is determined whether the sled has reached the intermediate position. For example, the intermediate position could be one track or a quarter of one track before the target position. Furthermore, more than one intermediate position can be selected in the present control method. For example, an intermediate position A can correspond to one track before the target position, and an intermediate position B can correspond to a quarter of one track before the target position. No matter how many intermediate positions are selected in the present invention, if the sled has reached one of the intermediate positions, go to step 52. Otherwise, go to step 50.

Step 50:

A general tracking access process is performed. Then, the flow is back to step 42.

Step 52:

It is determined the duration of exerting the brake force according to the sliding speed of the sled relative to the optical storage medium. According to the present invention, a brake counter Bc according to the sliding speed of the sled is determined, and then the duration of exerting the brake force is determined. One example of the relation between the brake counter and the sliding speed of the sled is:

If $3000 > V$, $Bc = 0$;

if $8000 > V \geq 3000$, $Bc = (V-3000)/1000$;

if $V \geq 8000$, $Bc = (V-8000)/500 + 5$;

Wherein V is the sliding speed of the sled relative to the optical storage medium and the unit of V is track/sec. Then, the duration of exerting the brake force is a sampling period multiplied by the brake counter, i.e., the duration=Bc*(the sampling period). Furthermore, the sampling period is a reciprocal of a sampling frequency, which is a frequency for triggering the optical storage medium drive to sense the position of the sled, for example, 176.4 KHz.

Step 54:

The brake force is exerted on the sled for the duration that was determined in step 52. Since the present control method utilizes different amounts of brake force, the execution of the brake force is either to keep the brake force constant and change the duration of exerting the brake force on the sled, or to keep the duration of exerting the brake force on the sled constant and change the amount of the brake force. Then, go back to step 42.

Step 56:

Since the sled has reached the target position, this step is the end of the procedure.

According to the present invention, the control method triggers the optical storage medium drive to detect the position of the sled by using a clock with a fixed interval in step 42. After the step 42, the procedure continues to the subsequent steps. Then, at the next trigger of the clock, the procedure goes back to step 42 and continues to the subsequent steps. The procedure is thus executed repeatedly till the sled reaches the target position. Typically, the clock used in step 42 has a much higher frequency than a rotation frequency of the optical storage medium. That is, when the sled moves from some track to a next track, the step 42 and the subsequent steps have recurred several times.

In contrast to the prior art, the tracking access control method according to the present invention is capable of dynamically determining the brake force exerted on the sled according to the sliding speed of the sled relative to the optical storage medium when the sled is located at the intermediate position in sliding from the initial position to the target position on the optical storage medium. According to the present invention, even when the accelerated force of the sled is too high, the tracking access control method can utilize a greater brake force to decelerate the sled to an appropriate speed so as to lock the sled to the desired target position easily. Since the sled can move at a higher speed, the time for reaching the target position is shorter. Consequently, the control method of the present invention can ensure the sled will substantially approach the target position by exerting the appropriate brake force on the sled, and the locking process of the sled can be performed precisely and fast. Therefore, the control method satisfies the high-speed demand of the optical storage medium drive for accessing information on the optical storage medium. Additionally, even when the hardware fabrication causes differences between the optical storage medium drives, the control method of the present invention can compensate for the differences so that the abilities of accessing data of the optical storage medium drives can be substantially improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A tracking access control method of an optical storage medium drive, the optical storage medium drive having a sled capable of sliding in a radial direction of a optical storage medium, the method comprising:

exerting a brake force on the sled according to a sliding speed of the sled relative to the optical storage medium when the sled is located at an intermediate position in sliding from an initial position to a target position on the optical storage medium, wherein the duration of exerting the brake force on the sled is constant, and the amount of the brake force is determined by the sliding speed of the sled relative to the optical storage medium.

2. The method of claim 1, wherein the intermediate position is located between the initial position and the target position.

3. The method of claim 1, wherein the optical storage medium is divided along the radial direction into a plurality of tracks for data storage, so that the initial, target, and intermediate positions correspond to tracks of the optical storage medium.

4. The method of claim 3, wherein the intermediate position is one track before the target position.

5. The method of claim 3, wherein the intermediate position is a quarter of one track before the target position.

6. A control circuit for controlling a sled of an optical storage medium drive, the sled capable of sliding in a radial direction of the optical storage medium, wherein the control circuit exerts a brake force on the sled according to a sliding speed of the sled relative to the optical storage medium when the sled is located at an intermediate position in a sliding course from an initial position to a target position on the optical storage medium, wherein the duration of exerting the brake force is constant and the amount of the brake force is determined by the sliding speed of the sled relative to the optical storage medium.

7. The control circuit of claim 6 wherein the intermediate position is located between the initial position and the target position.

8. The control circuit of claim 6 wherein the optical storage medium is divided along the radial direction into a plurality of tracks which stores data, such that the initial position, target position and the intermediate position correspond to tracks of the optical storage medium.

9. The control circuit of claim 8 wherein the track corresponding to the intermediate position is one track before the target position.

10. The control circuit of claim 8 wherein the track corresponding to the intermediate position is a quarter of one track before the target position.

* * * * *